Patented Jan. 21, 1936

2,028,397

UNITED STATES PATENT OFFICE 2,028,397

RUBBER DISPERSION IN ALKALI SILICATES

Max H. Kliefoth, Madison, Wis., assignor to C. F. Burgess Laboratories, Inc., Madison, Wis., a corporation of Delaware No Drawing. Application January 20, 1933, Serial No. 652,695

18 Claims. (Cl. 134—17)

This invention relates to alkali silicate adhesives and binders containing limited mounts of rubber uniformly dispersed therein.

It is an object of this invention to stabilize a dispersion of rubber, preferably in the form of rubber latex, in an alkali silicate solution so that the rubber remains dispersed until the silicate hardens.

When an alkali silicate solution, such as a sodium silicate solution, or water glass of commerce, is used as an adhesive, it becomes hard and brittle on drying. It is possible, however, to give the dried alkali silicate a certain resiliency and flexibility by incorporating rubber in it. This result may be obtained by the incorporation of a rubber solution or suspension, such as latex. The rubber, after it is thoroughly dispersed in the silicate by mechanical means, tends to coagulate again into larger masses or rise to form a layer at the top of the silicate, before the sodium silicate solution dries and hardens. Unless the rubber is kept dispersed during the drying and hardening operation its effect is lost. I have discovered a method for keeping the rubber solution or suspension dispersed in alkali silicate solutions, especially the more viscous solutions used extensively for adhesive purposes.

If a rubber solution or suspension, such as latex, is properly dispersed in a sodium silicate solution of high viscosity, it is possible to keep the rubber dispersed for a considerable period of time, usually sufficient to allow the alkali silicate to be manipulated and used in the usual manner and for the usual purposes.

I have found that the desired result can be obtained by adding a salt, or other chemical, which gels the alkali silicate, slowly to the solution, and then adding the rubber solution to it by means of a high speed beater or mixer.

Alkali silicofluorides, and particularly sodium silicofluoride, when added in powdered form to an alkali silicate solution and thoroughly mixed with it, give excellent results. The alkali silicofluorides are sparingly soluble in water. They probably act to decrease the alkalinity of the silicate rather than to form silicic acid or an insoluble silicate. Apparently any other material which lowers the alkalinity of the alkali silicate solution and which may be thoroughly mixed with it and used before considerable reaction takes place will accomplish the same result. Benzoic and citric acids (in powdered dry form) in small amounts may be used. Borax also may be used. The alkali silicofluorides, and especially the sodium salt, are preferred because they seem to give the best results. The globules of finely dispersed rubber solution or latex apparently are kept in suspension by a coagulated or thickened envelope of silicate or silica gel about each particle of reactive silicofluoride or other material. These salts also have the desirable property of increasing the water resistance of the alkali silicate, the silicofluoride being especially effective. The low water solubility of these silicofluorides apparently is a desirable property.

The sodium silicate preferably is one which is of medium alkalinity—an $SiO_2$ to $Na_2O$ ratio of 3.25 to 1 gives excellent results. Other ratios may be used although those with a higher $SiO_2$ ratio gel more rapidly when the gelling agent is mixed with them. The alkali silicate solution preferably is concentrated, that is, the solution is of a molasses consistency or of still higher viscosity. For example, a 3.25 to 1 $SiO_2$ to $Na_2O$ ratio silicate preferably should have a specific gravity of 40° Bé. or over.

The effect of the dispersing agent is clearly shown when the alkali silicate solution is examined under a microscope. Without the dispersing agent present the rubber globules coalesce rapidly and form relatively large bodies. With the dispersing agent present the globules remain dispersed.

Although the amounts of rubber solution, or latex, and dispersing agent may be varied over wide limits, it is desirable to keep the amounts of these used as low as possible because of their relatively high cost. For most adhesive purposes the amount of rubber latex, based on 60% rubber content in an ammoniacal solution, need not exceed 20% of the alkali silicate solution and preferably it should be less than 10%. As low as 1% of rubber latex may be used with good effect. Usually it is not feasible to use more than 10% of sodium silicofluoride because of the detrimental effect on the adhesive strength of the silicate. This amount, however, depends in part on the type of silicate used, and increases with increasing $Na_2O$ content. I prefer to use alkali silicofluoride in an amount less than 5% of the weight of the alkali silicate solution. Sodium silicofluoride in an amount equal to about 50% of the weight of 60% latex solution used is a convenient ratio which may be used. A sodium silicate solution containing 5% of latex and 2½% of sodium silicofluoride has given excellent results as an adhesive in the fabrication of sound absorbing tile. As little as 1% and as high as 5% of silicofluoride may be used with good results. The resulting product, especially if dried at 100° to 150° C., is resistant to the action of water. The water resistance increases with increase of dispersing agent. The finely dispersed rubber gives the product a resilience which is desirable for many purposes.

In a specific example the adhesive base was sodium silicate of 3.25 to 1 ratio and 42½° Bé. specific gravity. 15 parts of a 60% rubber latex stabilized with ammonia and 7½ parts of powdered sodium silicofluoride were added to 100 parts of the sodium silicate solution and incorporated therewith by means of a high speed mixer. The resulting adhesive, which is ready for use, if heated at 100° C. to harden it, withstands the action of cold water for many hours and of boiling water for over an hour. Without the silicofluoride present, the dried sodium silicate and rubber mixture dissolves in a few minutes in both hot and cold water.

A solution of rubber in benzol, carbon disulphide, aniline or other suitable solvent may be substituted for the rubber latex. However, such solutions do not seem to work as smoothly as the colloidal rubber suspension known as rubber latex and therefore the latex is the preferred material.

Throughout the claims, wherever latex or a rubber solution is specified quantitatively, it refers to a 60% solution or an amount of latex or rubber of different concentration containing an equivalent amount of rubber.

Whenever silica gel is referred to, it refers to any of the jelly-like products which may result from the gelling of an alkali silicate solution by the slow-acting chemicals mentioned herein, and formed by any or all of the methods described herein.

I claim:

1. The method for dispersing rubber in a concentrated alkali silicate solution which comprises thoroughly mixing therewith less than 12 percent of rubber in the form of a rubber solution or suspension, and a silicofluoride which is slightly water soluble.

2. The method for dispersing rubber in a concentrated sodium silicate solution which comprises thoroughly mixing therewith less than 12 percent of rubber in the form of rubber latex and sodium silicofluoride.

3. The method for dispersing rubber in a concentrated alkali silicate solution which comprises thoroughly mixing therewith less than 12 percent of rubber in the form of a powdered alkali silicofluoride and rubber latex in an amount greater than said silicofluoride.

4. A concentrated alkali silicate solution containing not more than 12 percent of rubber in the form of globules of rubber solution fixedly dispersed therein and small particles of hydrous gel intimately associated with said rubber solution globules and holding said globules in fixed dispersion, together with the alkali metal salts formed by the reaction between said alkali silicate and a substance thoroughly mixed therewith which reacts to lower the alkalinity of said silicate and gel it, said substance being of such a character that it may be thoroughly mixed with said alkali silicate solution and not cause complete gelation thereof for a substantial period of time.

5. A concentrated alkali silicate solution containing not more than 12 per cent of rubber in the form of rubber latex fixedly dispersed therein and particles of a solid substance associated with said latex globules, said solid substance being a material which reacts to lower the alkalinity of said silicate and gel it, and is of such a character that it may be thoroughly mixed with said alkali silicate solution without causing it to gel for a substantial period of time.

6. The product of claim 5 in which the solid substance is a silicofluoride which is slightly water soluble.

7. The product of claim 5 in which the solid substance is an alkali silicofluoride.

8. The product of claim 5 in which the alkali silicate is sodium silicate and the solid substance is sodium silicofluoride.

9. The product of claim 5 in which the alkali silicate solution is of high viscosity.

10. A concentrated alkali silicate solution containing less than 10% of rubber latex fixedly and uniformly dispersed throughout, and particles of a solid substance which reacts to lower the alkalinity of said silicate and gel it, said substance being of such a character and being present in such amount that it may be thoroughly mixed with said alkali silicate solution without appreciably changing the characteristics of said solution and will not cause complete gelation for a substantial period of time.

11. The product of claim 10 in which the reacting solid substance is an alkali metal silicofluoride.

12. The product of claim 10 in which the alkali silicate is sodium silicate and the reacting substance is sodium silicofluoride.

13. The product of claim 10 in which the latex is present in an amount less than 5% of the alkali silicate solution and in which the reacting substance is sodium silicofluoride which is present in an amount less than 10% of the alkali silicate solution.

14. The product formed by the drying of an alkali silicate solution containing not more than 12 per cent of rubber in the form of rubber latex fixedly and uniformly dispersed throughout by means of hydrous silica gel formed in situ by alkali silicofluoride, the product being characterized by a resiliency which is absent when the latex is not present therein and by a high resistance to disintegration by water.

15. The method for dispersing rubber in a concentrated alkali silicate solution which comprises thoroughly mixing therewith an amount of rubber, in the form of a rubber solution or suspension, not exceeding 12 percent of the weight of said alkali silicate solution and a quantity of a substance which lowers the alkalinity of said silicate and is of a character so that it may be thoroughly mixed with said alkali silicate solution and not cause complete gelation thereof for a substantial period of time.

16. The method for dispersing rubber in a concentrated alkali silicate solution which comprises adding to said solution an amount of rubber, in the form of rubber latex, not exceeding 12 percent of the weight of said alkali silicate solution and a reagent from the group consisting of alkali silicofluorides, benzoic acid, citric acid and borax, and dispersing said rubber latex and the gel formed by said reagent in said alkali silicate solution.

17. The method for dispersing rubber in an alkali silicate solution which comprises thoroughly mixing therewith less than 12 percent of rubber in the form of rubber latex and a quantity of a powdered substance which lowers the alkalinity of said alkali silicate to produce a gel of said silicate and is of a character that it may be thoroughly mixed with said alkali silicate solution and not cause complete gelation thereof for a substantial period of time.

18. The product formed by the drying of the intimate mixture of alkali silicate solution, rubber solution and dispersing agent defined by claim 4, the product being characterized by a resiliency which is absent when the rubber is not present therein.

MAX H. KLIEFOTH.